Oct. 6, 1959 A. J. MEI ET AL 2,907,556
SEALED AGITATOR
Filed July 18, 1957 2 Sheets-Sheet 1

WITNESSES
Edwin E. Bassler
Donald J. Smith

INVENTORS
Anthony J. Mei &
Thomas F. Widmer
BY
Arthur T. Stratton
ATTORNEY

United States Patent Office 2,907,556
Patented Oct. 6, 1959

2,907,556

SEALED AGITATOR

Anthony J. Mei, Franklin Township, Murrysville County, and Thomas F. Widmer, New Kensington, Pa., assignors to Westinghouse Electric Corporation, East Pittsburgh, Pa., a corporation of Pennsylvania Application July 18, 1957, Serial No. 672,661

11 Claims. (Cl. 259—101)

The present invention relates to an agitating vessel adapted for use with highly pressurized or extremely hazardous fluids, and more particularly to an agitating vessel which can be hermetically sealed.

When agitating or stirring certain types of liquids or slurries which are subjected to extremely high pressures or are in themselves hazardous or corrosive, it is frequently necessary or desirable to provide a sealed vessel and agitating means therefor wherein no packing materials, lubricated parts, or relatively moving engaged parts, can come into contact with the liquid. Moreover, when handling such liquids in certain applications wherein it is extremely important to exclude foreign matter therefrom, it is essential that any contact between the liquid and any wearing parts of the agitating means or parts thereof subject to erosion or corrosion by the liquid, be prevented positively. More specifically, in order to handle such liquids safely without endangering operating personnel by leakage of liquid from the vessel and without encountering the possibility of contaminating the liquid by leakage of foreign matter into the vessel, it is desirable in many such cases not only to seal hermetically the contents of the vessel from the exterior thereof but also to seal hermetically the agitating mechanism of the vessel from the contents thereof.

Prior mixing or agitating vessels, so far as it is known, have provided no means for conveniently and hermetically sealing the contents of the vessel. On the other hand, known attempts to effect a sealed arrangement of this nature have employed conventional packing arrangements and supporting means for the agitator of the vessel which were subject to leakage as a result of vibration and other wear-causing motion of the agitating means. Additionally, such prior arrangements required a multiplicity of parts in order to accommodate the aforesaid packing arrangements. As indicated previously, it is impractical to use such packing arrangements in the presence of some types of corrosive or erosive liquids or when handling such liquids at elevated temperatures and pressures. Relative to the latter aspect, no means has hitherto been proposed for adequately and positively sealing the agitating means of a mixing vessel subjected to extremely high pressures, for example in the neighborhood of 2000 pounds per square inch or more.

In view of the foregoing, it is an object of the invention to provide a mixing vessel and agitating means therefor which can be hermetically sealed.

Another object of the invention is to provide an agitating vessel of the character described adapted for use at extremely high pressures and temperatures.

A further object of the invention is to provide an agitating vessel having a minimum of component parts.

Still another object of the invention is to provide an agitating vessel arranged for the convenient handling of corrosive and erosive liquids.

A still further object of the invention is to provide a hermetically sealed agitating vessel which can be assembled and disassembled with relative ease.

Another object is to provide a mixing vessel and agitating means therefor, wherein no wearing or lubricated parts, or packing materials are contacted by the liquid or its vapor contained within the vessel.

These and other objects, features and advantages of the invention will be made apparent during the forthcoming description of exemplary forms thereof with the description being taken in conjunction with the accompanying drawings, wherein.

In accordance with the invention, a mixing vessel and agitating means therefor are mutually adapted for handling both corrosive and erosive liquids or slurries, and their vapors, at extreme pressures and temperatures. In furtherance of this purpose, both the vessel and the agitating means are arranged in a manner that no bearings, mechanical seals or relatively moving engaging parts can come into contact with the liquid or with the vapor thereof existing in the region above the liquid level in the vessel. In other applications of the invention, the agitating vessel is arranged for mixing or stirring a fluid of any kind under these conditions within a hermetically sealed fluid system.

An exemplary but certainly not a limitative application of the invention is found in the nuclear power generating field particularly in conjunction with a homogeneous neutronic reactor. In certain forms of such reactors, a slurry is utilized which contains a coolant-moderator liquid and nuclear fuel particles which are often abrasive. In this latter application, there is a frequent necessity for providing agitated storage vessels for the slurry or suspension of abrasive particles, which vessels will prevent sedimentation or separation from the liquid of the solid content of the slurry. The storage vessel and its agitating means, in some applications, is intended to operate under pressures ranging to 2,000 pounds per square inch and higher and within a temperature range of 100 to 600° F. The slurry handled in this manner is not only corrosive and abrasive but in some cases is exceedingly radioactive, with an attendant personnel hazard in the event of leakage.

Figure 1:
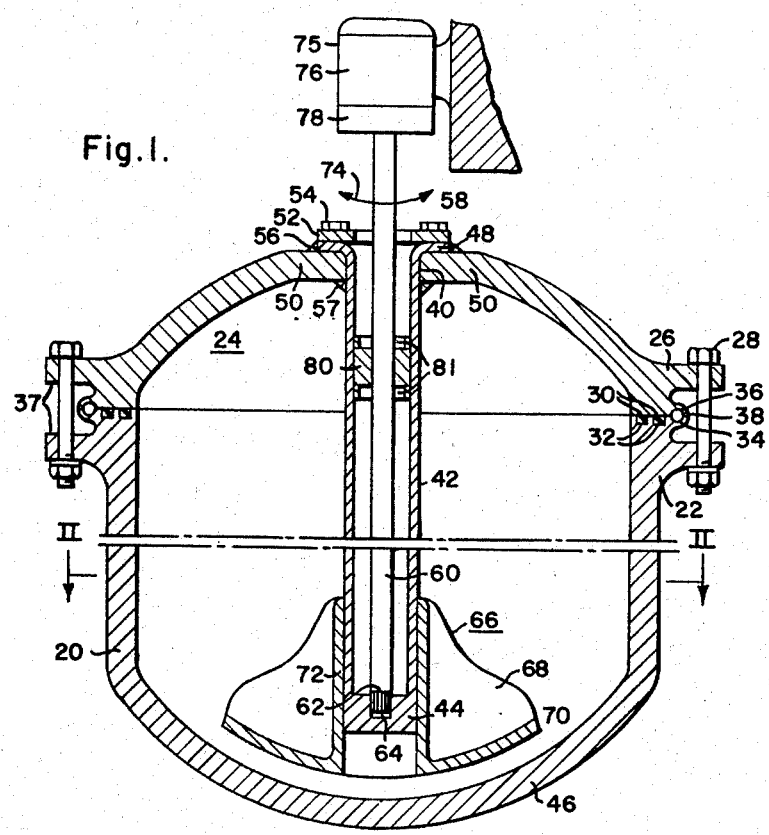
Figure 1 is a longitudinal sectional view of one form of an agitating vessel and associated components arranged in accordance with the invention.
Figure 2:
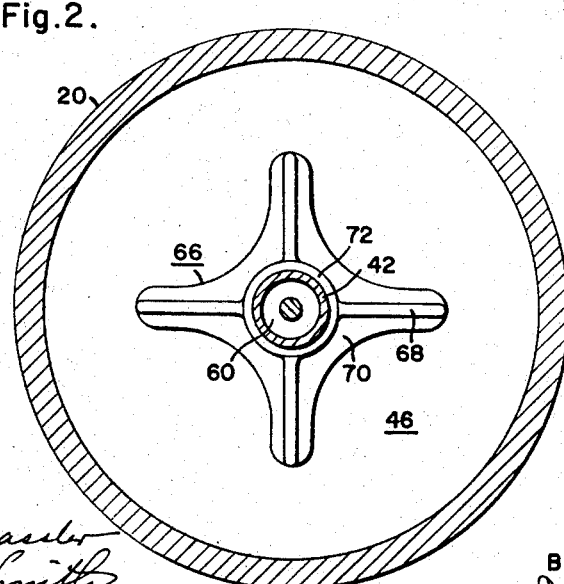
Fig. 2 is a cross-sectional view of the agitating vessel illustrated in Fig. 1 and taken along reference lines II—II thereof.

Referring now more particularly to Figs. 1 and 2 of drawings, the exemplary modification of the invention shown therein comprises a vessel 20 having a mounting flange 22 disposed adjacent an opening at the upper end of the vessel. A top cover 24 is provided for the vessel 20 and is equipped with a similar or complementary mounting flange 26 disposed adjacent the downward edge of the cover 24. The top cover 24 is joined to the vessel 20, accordingly, by securing the respective flanges 26 and 22 thereof as by a plurality of mounting bolts 28. In certain applications, the top cover 24 is sealed to the vessel 20 at the junction between the aforesaid mounting flanges by one or more sealing O-rings 30 each disposed in an annular groove 32 formed on an engaging face of one of the mounting flanges 22 or 26. In an exemplary application of the invention, two such O-ring and groove arrangements 30—32 are employed and are disposed upon the upward face of the mounting flange 22 secured to the vessel 20. Obviously, in some applications of the invention any equivalent type of gasket means can be employed in place of the O-rings 30.

When it is found desirable to seal hermetically the vessel 20 and its associated components, the mounting flanges 22 and 26 are provided with a pair of continuous opposing projections 34 and 36. Each of the projections 34 and 36 is disposed adjacent the junction between the mounting flanges 22 and 26 and thus are arranged for the application of an annular sealing weld 38 thereto in order to form a continuous but relatively easily severable hermetically-sealed enclosure about the aforesaid junction between the mounting flanges. For this purpose, the outermost opposing surfaces of the flanges 22 and 26 are separated, as indicated by the reference characters 37, in order to provide clearance for disposing projections 34 and 36 inwardly of the mounting bolts 28 and for permitting access thereto.

With this arrangement, the top cover 24 can be removed simply by removing the mounting bolts 28 and by severing the weld 38. One form of the aforesaid sealing weld arrangement has been described in a copending application of Kreh et al., on Container End Structure, filed November 17, 1953, as Serial No. 392,692, now Patent No. 2,805,789, and assigned to the assignee of the present application. Accordingly, further elaboration upon this type of hermetically sealing means is deemed unnecessary.

The top cover 24 is further provided with a central opening 40 through which an elongated resilient torsion tube 42 is inserted and from which the tube extends downwardly through the interior of the vessel 20 where it terminates in this example in a sealed end portion 44 disposed adjacent the bottom wall 46 of the vessel. In this arrangement of the invention, the torsion tube 42 is fabricated from a relatively rigid but resilient metal such as stainless steel and is provided with an integral flange 48 arranged adjacent its upper end and by overlapping the adjacent wall portions 50 of the top cover serves to support the torsion tube 42 within the vessel. The flange 48 of the torsion tube is secured against any pressures developed within the vessel 20 by means of an annular clamping plate 52 and a plurality of mounting screws 54 which are inserted through suitable apertures disposed in the plate 52 and the flange 48. An appropriate sealing gasket or the like (not shown) is inserted between the flange 48 and the wall portions 50. Alternatively, the flange 48 is hermetically sealed to the top cover 50 by means of one of annular sealing welds 56 or 57, or both, which is used in conjunction with the aforesaid clamping plate 52 and mounting bolts 54, or in those applications wherein the vessel 20 is subjected to lower pressures is employed alone as a strength weld. Inserted through the central opening 58 of the clamping plate 52 and extending through the interior of the torsion tube 42 is a driving shaft 60 which is rigid relative to the torsion tube and which is provided at the lower end thereof with means for securing a driving connection between the shaft and the lower end portion 44 of the torsion tube. Any well-known driving connection can be utilized for this purpose including a cogged or scored stud portion 62 formed adjacent the lower end of the driving shaft and inserted into a complementary cogged recess 64 formed in the end portion 44 of the torsion tube. As pointed out more fully hereinafter, the driving connection in this example is capable of transmitting oscillatory movement of the driving shaft to the lower end of the torsion tube. Due to the structural characteristics of the torsion tube 42, in this example, the weight of the driving shaft 60 is at least partially supported by the tube 42.

Secured to the lower end of the torsion tube 42 and supported thereby is an impeller or agitator 66 of a design suitable to impart a required amount of agitation to the liquid contained in the vessel upon oscillation of the agitator 66 in a manner presently to be described. In this example of the invention as better shown in Fig. 2 of the drawings, the agitator 66 is provided with a plurality of upstanding vane or web portions 68 with four being utilized in this example of the invention, which vane portions are joined to a bottom supporting member 70 and to a substantially vertically disposed tubular structural member 72 forming the central portion of the impeller 66. The tubular member 72 is rigidly joined to the torsion tube 42 adjacent the lower end thereof, as by welding, while the supporting member 70 is shaped to conform substantially to the spheroidal configuration of the bottom wall 46 of the vessel 20. This configuration of the bottom wall is desirable in those applications wherein the sealed vessel is employed for storing or agitating a slurry in order to minimize sedimentation of the solid material of the slurry adjacent these bottom portions of the vessel which are relatively removed from the agitator 66. Additional agitators of similar or different configuration can be joined in a similar manner to the torsion tube 42 and disposed desirably along the length thereof. The employment of additional agitators in this manner is particularly desirable in some applications of the invention wherein the height or length of the agitating vessel 20 is relatively larger than its diameter.

To actuate the agitator 66 in order to stir the slurry or liquid contained within vessel 20, an oscillatory motion is imparted to the driving shaft 60, about its longitudinal axis, as indicated by arrows 74 by any suitable driving means, for example an electric motor 76 equipped with a suitable well-known gearing attachment 78 arranged to provide an oscillating output to the shaft 60. It will be appreciated that the aforesaid oscillatory driving motion is substantially equivalent to the natural oscillatory frequency of the torsion tube 42. When operated in this fashion, the driving shaft 60 imparts a twisting motion to the torsion tube 42, which motion, of course, has its greatest amplitude adjacent the bottom end 44 thereof. Since the driving shaft is rigidly, but detachably, connected to the bottom end 44 of the torsion tube 42, and since the agitator 66 is also rigidly connected to the torsion tube, the full oscillatory swing or angular displacement of the driving shaft 60 is imparted to the agitator 66. The driving shaft 60 and the agitator 66 are desirably disposed coaxially of the torsion tube 42 in order to counterbalance substantially the forces applied thereto by the agitator 66 as the latter moves through the liquid contained within the vessel. The driving shaft 60 is positioned thusly adjacent the upward end of the torsion tube 42 by means of a suitable bearing 80 secured to an inner wall portion of the torsion tube 42 and engaging the driving shaft 60. The bearing 80 is supported by the torsion tube, in this example, by a pair of collar members 81 shrunk-fitted to an inner wall portion of the tube 42, or alternatively by shrink fitting the bearing 80 itself in this manner. With this arrangement of the invention, it is evident that the driving shaft 60 can be readily disassembled from the agitating vessel by simply withdrawing it from the torsion tube 42 and through the bearing arrangement 80.

Figure 3:
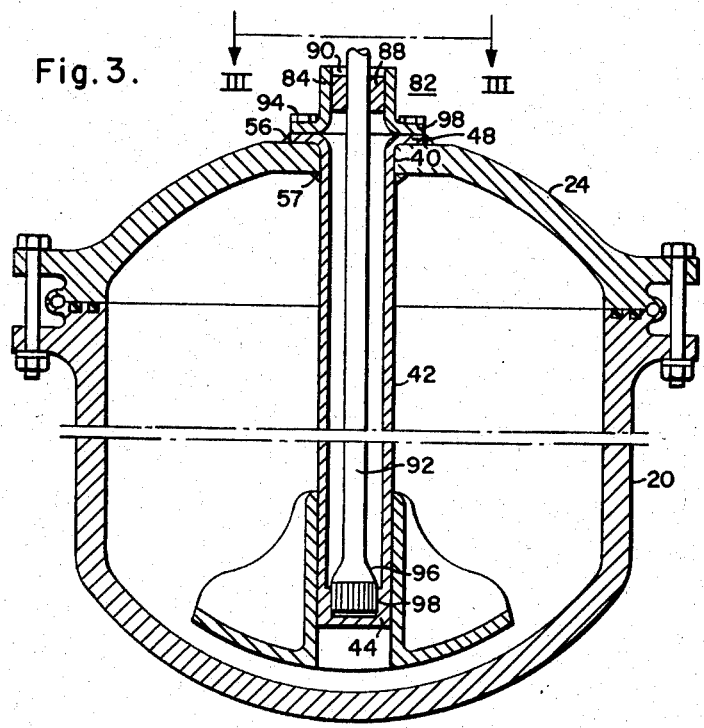
Fig. 3 is a longitudinal sectional view of another exemplary form of the invention.
Figure 4:
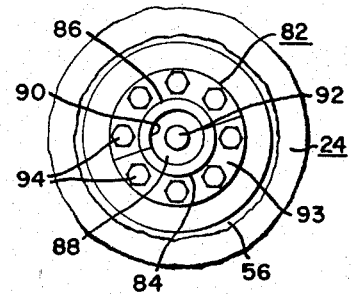
Fig. 4 is a top plan view of the bearing arrangement of Fig. 3, taken along reference lines III—III thereof.

Alternatively, as better shown in Fig. 3 of the drawings, the single bearing required for the agitating means can be disposed outside of the vessel 20 for easier accessibility thereto for purpose of maintenance and repair and the like. In this latter arrangement of the invention, a bipartite bearing housing 82 is provided which includes a pair of opposing collar portions 84 and 86 (Fig. 4) which are joined, in a manner presently to be described, to form a housing for a driving shaft bearing 88. When thus joined, a central cavity 90 is formed by the component parts of the bearing housing, which cavity communicates with the interior of the torsion tube 42. The bearing arrangement 88 then is mounted within the annular space provided between a driving shaft 92 and the bearing housing 82. The component collar portions 84 and 86 of the bearing housing, when joined, form a flange member 93 at the lower end of the bearing housing 82. In this arrangement of the invention, the aforesaid flange member 93 is provided desirably with sufficient structural strength such that when the component collar portions 84 and 86 of the bearing housing are joined and mounted upon the top cover 24 of the vessel, the flange 93 serves the same function as that of the annular clamping plate 52 discussed in connection with Fig. 1. Accordingly, the clamping plate 52 is eliminated, and the flange 93 of the bearing housing and the torsion tube flange 48 are bolted to the top cover 24 adjacent its central opening 40 by means of a plurality of mounting bolts 94.

In this example of the invention, the torsion tube 42 desirably is hermetically sealed by means of the annular sealing welds 56 and 57, as discussed heretofore in connection with Fig. 1. With this arrangement, then, the bearing 88 is readily accessible, and by providing the bearing in two or more portions thereof, the same can be readily removed without withdrawing the driving shaft 92 from the torsion tube 42.

Although the driving shaft 92 obviously can be provided in this latter form of the invention with a configuration substantially similar to that of the drive shaft 60 illustrated in Fig. 1 of the drawings, in one example of the invention, the driving shaft 92 is formed with an enlarged section 96 adjacent its lower end such that a stronger driving connection is afforded between the enlarged section 96 and the bottom 44 of the torsion tube. As is explained heretofore in connection with Fig. 1, this driving connection can be provided in a variety of forms, and in this example is furnished with the cogged or scored arrangement indicated generally by the reference character 98. When employing the driving shaft 92 having the enlarged section 96, it will be appreciated that the bearing arrangement 88 is desirably provided in two or more portions in order to remove the same before withdrawing the driving shaft 92 from the torsion tube 42. However, where the driving shaft 92 is provided in the form illustrated in Fig. 1, it is to be understood that either or both of the bearing housing 82 and the bearing 88 can be provided in an integral form.

From the foregoing, it will be apparent that novel and efficient forms of a mixing vessel and agitating means therefor have been disclosed, which are adaptable particularly for use in applications in conjunction with hermetically sealed liquid systems or in other applications requiring a minimum of component parts. The foregoing descriptive matter has been presented for purposes of illustrating the invention and, therefore, is not to be interpreted as limitative thereof. Accordingly, numerous modifications of the invention will occur to those skilled in the art without departing from the spirit and scope of the invention. Moreover, it is understood that certain features of the invention can be utilized without a corresponding use of other features.

We claim as our invention:

1. Agitating means comprising a vessel having an opening in a wall portion thereof, an elongated resilient torsion tube inserted through said opening and secured adjacent one end of said tube to said vessel adjacent said opening, an agitator secured to said tube adjacent the other end thereof, a driving shaft extending through said opening and substantially along the length of said tube, said shaft being secured to said other end of said tube to transmit oscillating movement thereto, and means for oscillating said driving shaft about its longitudinal axis.

2. Agitating means comprising a vessel having an opening in a wall portion thereof, an elongated resilient torsion tube inserted through said opening and secured adjacent one end of said tube to said vessel adjacent said opening, an agitator secured to said tube adjacent the other end thereof, a driving shaft extending through said opening and substantially along the length of said tube, said shaft being secured to said other end of said tube to transmit oscillating movement thereto, a bearing member engaging said driving shaft and mounted within said tube at a position removed from said other end, and means for oscillating said driving shaft about its longitudinal axis.

3. Agitating means comprising a vessel having an opening in a wall portion thereof, an elongated resilient torsion tube inserted through said opening, said tube being joined and hermetically sealed adjacent one end of said tube to said wall portion adjacent said opening and having the other end thereof hermetically sealed from the interior of said vessel, an agitator secured to said tube adjacent said other end of said tube, a driving shaft extending through said opening and substantially through said torsion tube, said shaft being secured to said other end to transmit oscillating movement thereto, and means for oscillating said driving shaft about its longitudinal axis.

4. Agitating means comprising a vessel having an opening in a wall portion thereof, an elongated resilient torsion tube inserted through said opening and joined adjacent one end thereof to said wall portion adjacent said opening, a bearing housing joined to said wall portion adjacent said opening and communicating with the interior of said torsion tube, a driving shaft extending through said housing and substantially through said torsion tube, said driving shaft being secured to said torsion tube adjacent the other end thereof to transmit oscillating movement thereto, an agitator secured to said torsion tube adjacent said other end, a bearing member mounted in said housing and engaging said driving shaft, and means for oscillating said driving shaft about its longitudinal axis.

5. Agitating means including a vessel having an opening in a wall portion thereof, an elongated resilient torsion tube inserted through said opening, said tube having a portion protruding exteriorly from said vessel opening and terminated in a flanged portion, a bearing housing having a clamping flange secured thereto and disposed adjacent said torsion tube flange, means for securing said clamping flange and said torsion tube flange to said wall portion, a driving shaft extending through said housing and substantially through said torsion tube, said driving shaft being secured to said tube adjacent the other end thereof to transmit oscillating movement thereto, an agitator secured to said torsion tube adjacent said other end, a bearing member mounted in said housing and engaging said driving shaft, and means for oscillating said shaft about its longitudinal axis.

6. Agitating means comprising a vessel having an opening in a wall portion thereof, an elongated resilient torsion tube inserted through said opening and secured adjacent one end thereof to said vessel adjacent said opening, an agitator secured to said tube adjacent the other end thereof, a driving shaft extending substantially along the length of said tube and secured to said other end of said tube to transmit oscillating movement thereto, a bearing member engaging said driving shaft and mounted within said tube at a position removed from said other end, said bearing member being secured to and supported by an inner wall portion of said torsion tube, and means for oscillating said drivng shaft about its longitudinal axis.

7. Agitating means comprising a vessel having an opening in a wall portion thereof, an elongated resilient torsion tube inserted through said opening and secured at one end thereof to said vessel adjacent said opening, an agitator secured to said tube adjacent the other end thereof, a driving shaft extending substantially along the length of said tube and secured to said other end of said tube to transmit oscillating movement thereto, said driving shaft in addition being at least partially supported by said tube, and means for oscillating said driving shaft about its longitudinal axis.

8. Agitating means comprising a vessel having an opening in an upper wall portion thereof, an elongated resilient torsion tube inserted through said opening, means for securing the upper end of said tube to a wall portion of said vessel adjacent said opening, said tube being maintained in an upstanding position by said securing means, an agitator secured to said tube adjacent the lower end thereof, a driving shaft extending through said opening and substantially along the length of said tube, said shaft being secured to said other end of said tube to transmit oscillating movement thereto, said driving shaft in addition being supported by said tube, and means for oscillating said driving shaft about its longitudinal axis.

9. Agitating means comprising a vessel having an opening in a wall portion thereof, an elongated resilient torsion tube inserted through said opening, means for securing the upper end of said tube to a wall portion of said vessel adjacent said opening, said tube being maintained in an upstanding position by said securing means, an agitator secured to said tube adjacent the lower end thereof, a driving shaft extending through said opening and substantially along the length of said tube, said shaft being secured to said other end of said tube to transmit oscillating movement thereto, said driving shaft in addition being supported by said tube, means for oscillating said driving shaft about its longitudinal axis, and a bearing member inserted between said shaft and said tube and positioned intermediate said tube ends, said bearing member maintaining said shaft substantially coaxially of said tube.

10. A hermetically sealed mixing vessel comprising a container, a cover for said container, means for hermetically sealing and joining said cover to said container, said cover having an opening therein, an elongated resilient torsion tube inserted into said container through said cover opening and secured adjacent one end of said tube to said cover adjacent said opening, an agitator mounted within said container and secured to said tube adjacent the other end thereof, a driving shaft extending through said opening and substantially along the length of said tube, said shaft being secured to said other end to transmit oscillating movement thereto, and means for oscillating said driving shaft about its longitudinal axis.

11. Agitating means comprising a support having an opening in a wall portion thereof, an elongated resilient torsion tube inserted through said opening and secured adjacent one end of said tube to said support, an agitator secured to said tube adjacent the other end thereof, means for mounting said support on a container so that said tube and said agitator extend therein, a driving shaft extending through said opening and substantially along the length of said tube, said shaft being secured to said other end of the tube to transmit oscillating movement thereto, and means for oscillating said driving shaft about its longitudinal axis.

References Cited in the file of this patent

UNITED STATES PATENTS

| | | |
|---|---|---|
| 1,966,537 | Binckley | July 17, 1934 |
| 2,059,183 | Hume | Oct. 27, 1936 |